(12) United States Patent
Wang et al.

(10) Patent No.: US 11,295,054 B1
(45) Date of Patent: Apr. 5, 2022

(54) METHOD FOR DESIGNING POWER NETWORK AND POWER NETWORK

(71) Applicant: Shanghai Zhaoxin Semiconductor Co., Ltd., Shanghai (CN)

(72) Inventors: Long Wang, Beijing (CN); Jerming Lin, Beijing (CN); Yi Li, Beijing (CN); Xiaojing Li, Beijing (CN); Di Al, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/085,059

(22) Filed: Oct. 30, 2020

(30) Foreign Application Priority Data

Sep. 30, 2020 (CN) .......................... 202011054653.X

(51) Int. Cl.
*G06F 30/30* (2020.01)
*G06F 30/394* (2020.01)
*G06F 30/347* (2020.01)
*H01L 23/522* (2006.01)
*G06F 16/901* (2019.01)
*G06F 30/333* (2020.01)

(52) U.S. Cl.
CPC ........ *G06F 30/394* (2020.01); *G06F 16/9017* (2019.01); *G06F 30/333* (2020.01); *G06F 30/347* (2020.01); *H01L 23/5226* (2013.01)

(58) Field of Classification Search
CPC .. G06F 30/394; G06F 16/9017; G06F 30/333; G06F 30/34; H01L 23/5226
USPC .......................................................... 716/126
See application file for complete search history.

(56) References Cited

U.S. PATENT DOCUMENTS

| | | | |
|---|---|---|---|
| 10,552,568 B2 * | 2/2020 | Chen .................... | G06F 30/394 |
| 11,049,942 B2 * | 6/2021 | Shirota ............... | H01L 29/1608 |
| 2011/0001168 A1 * | 1/2011 | Ko ...................... | H01L 23/5286 |
| | | | 257/207 |
| 2015/0263039 A1 * | 9/2015 | Singh ................ | H01L 27/11807 |
| | | | 257/206 |

\* cited by examiner

*Primary Examiner* — Jack Chiang
*Assistant Examiner* — Brandon Bowers
(74) *Attorney, Agent, or Firm* — McClure, Qualey & Rodack, LLP

(57) ABSTRACT

A method for designing a power network is provided and includes: initializing via widths and power-trace widths; determining whether utilization rates of first, second and third routing tracks are respectively equal to first, second and third values; when said utilization rate of said first routing tracks is not equal to said first value, adjusting said distance between first and second power traces until said utilization rate thereof is equal to said first value; when said utilization rate of said second routing tracks is not equal to said second value, adjusting said distance between third and fourth power traces until said utilization rate thereof is equal to said second value; and when said utilization rate of said third routing tracks is not equal to said third value, adjusting said distance between fifth and sixth power traces until said utilization rate thereof is equal to said third value.

8 Claims, 12 Drawing Sheets

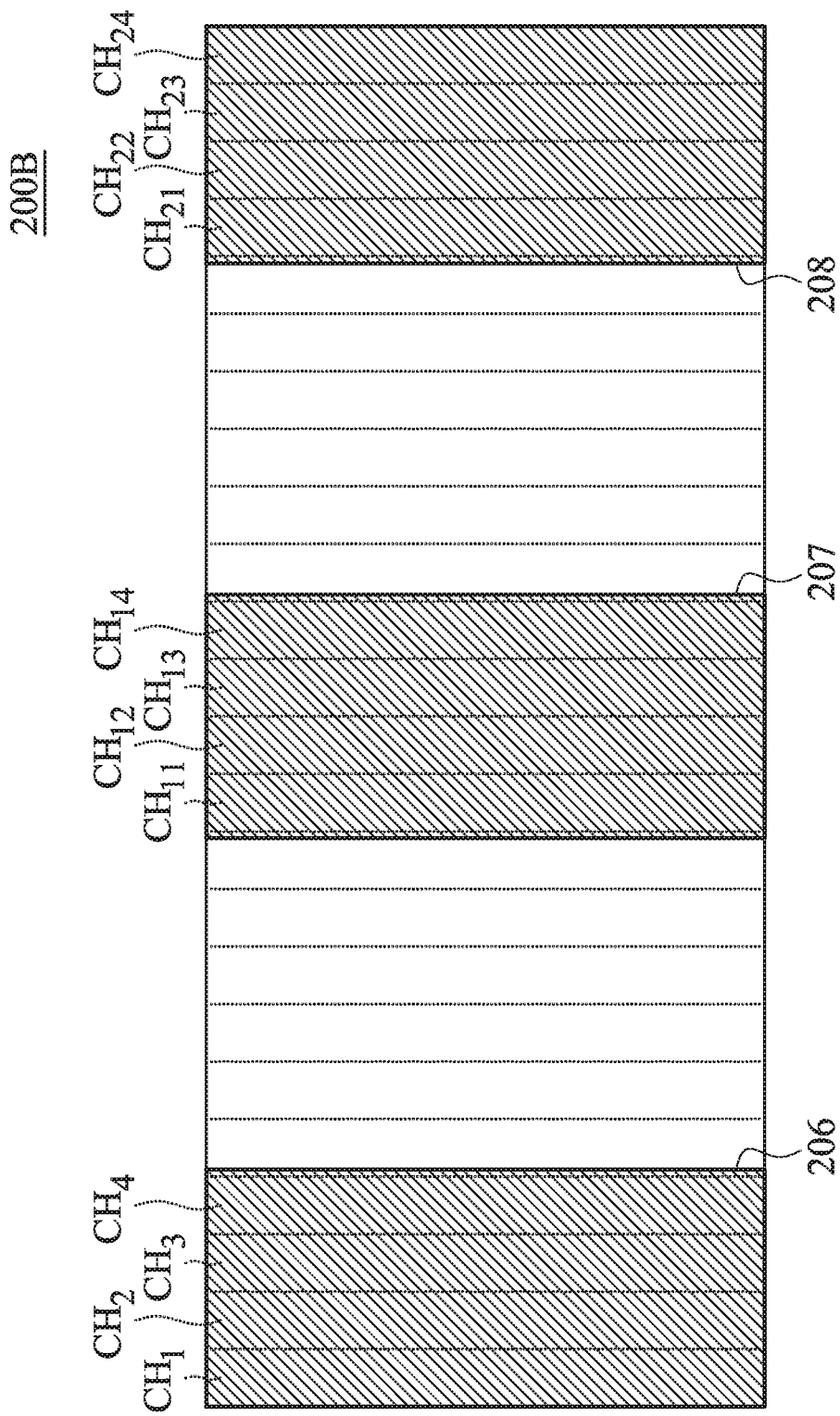

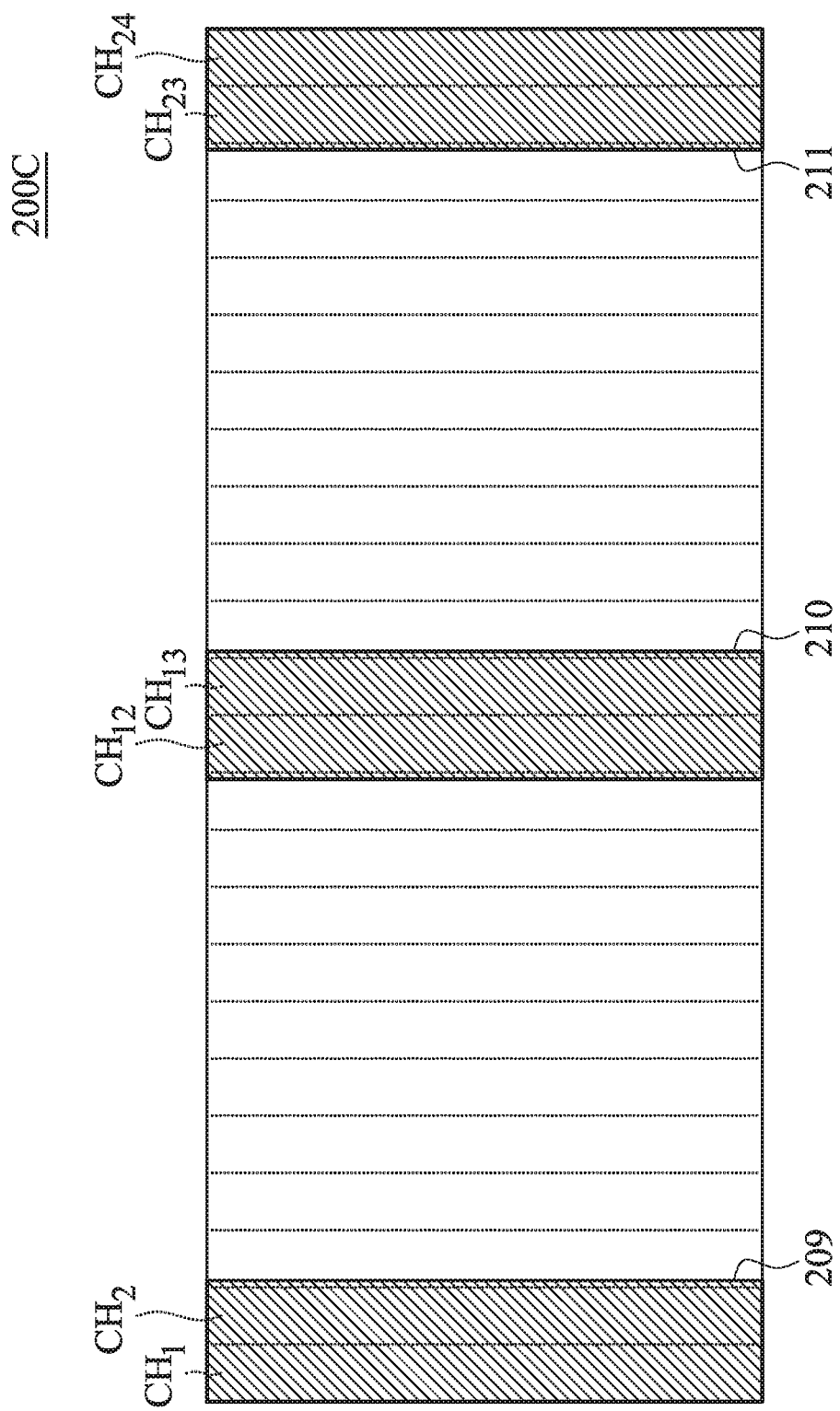

METHOD FOR DESIGNING POWER NETWORK AND POWER NETWORK

CROSS REFERENCE TO RELATED APPLICATIONS

This application claims priority of China Patent Application No. 202011054653.X, filed on Sep. 30, 2020, the entirety of which is incorporated by reference herein.

BACKGROUND OF THE INVENTION

Field of the Invention

The present invention relates to a method for designing a power network, and in particular to a method for designing a power network with multiple metal layers.

Description of the Related Art

Generally, a current flows from an external power point to a first metal layer of a power network, then to a second metal layer thereof through a via, and then to a bottom metal layer thereof through another via. If the width of the power traces of the second metal layer is smaller than the width of the bottom metal layer, the ability of the second metal layer to supply power will be lower than the ability of the bottom metal layer to supply power.

BRIEF SUMMARY OF THE INVENTION

An exemplary embodiment of the present invention provides a method for designing a power network. The power network comprises a first metal layer, a second metal layer and a third metal layer. The first metal layer comprises a plurality of first routing tracks. The second metal layer comprises a plurality of second routing tracks. The third metal layer comprises a plurality of third routing tracks. The second metal layer is configured between the first metal layer and the third metal layer. The method for designing the power network comprises the following steps. Initializing via widths and power-trace widths. Determining whether a utilization rate of the plurality of first routing tracks, a utilization rate of the plurality of second routing tracks and a utilization rate of the plurality of third routing tracks are respectively equal to a first value, a second value and a third value. When the utilization rate of the plurality of first routing tracks is not equal to the first value, adjusting a distance between a first power trace and a second power trace of the first metal layer until the utilization rate of the plurality of first routing tracks is equal to the first value. When the utilization rate of the plurality of second routing tracks is not equal to the second value, adjusting a distance between a third power trace and a fourth power trace of the second metal layer until the utilization rate of the plurality of second routing tracks is equal to the second value. And when the utilization rate of the plurality of third routing tracks is not equal to the third value, adjusting a distance between a fifth power trace and a sixth power trace of the third metal layer until the utilization rate of the plurality of third routing tracks is equal to the third value.

An exemplary embodiment of the present invention provides a power network. The power network comprises a first metal layer, a second metal layer and a third metal layer. The first metal layer comprises a plurality of first routing tracks, a plurality of first power traces and a plurality of first vias. The plurality of first power traces are electrically connected to the plurality of first vias. The second metal layer comprises a plurality of second routing tracks and a plurality of second vias. The plurality of second vias are electrically connected to the plurality of first vias. The third metal layer comprises a plurality of third routing tracks, a plurality of third power traces and a plurality of third vias. The plurality of third power traces are electrically connected to the plurality of second vias and the plurality of third vias. A utilization rate of the plurality of first routing tracks is greater than a utilization rate of the plurality of second routing tracks. The utilization rate of the plurality of second routing tracks is greater than a utilization rate of the plurality of third routing tracks.

The method for designing a power network of the present invention may be implemented by hardware or firmware that can perform specific functions or may be recorded in a recording medium through program codes and implemented in conjunction with specific hardware. When the program codes are loaded and executed by an electronic device, processor, computer, or machine, the electronic device, processor, computer, or machine serves as a device or system for implementing the present invention.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 2A-2C are schematic diagrams of routing tracks according to an exemplary embodiment;

DETAILED DESCRIPTION OF THE INVENTION

In order to make the purpose, features, and advantages of the present invention more obvious and understandable, the following examples are specially provided, and the accompanying drawings are used for detailed description. The specification of the present invention provides different examples to illustrate the technical features of different embodiments of the present invention. The configuration of each component in the embodiments is for illustrative purposes and is not used to limit the present invention. In addition, the repetition of the symbols shown in the accompanying drawings according to the embodiments is for simplifying the description and does not imply the relevance between different embodiments.

Figure 1:
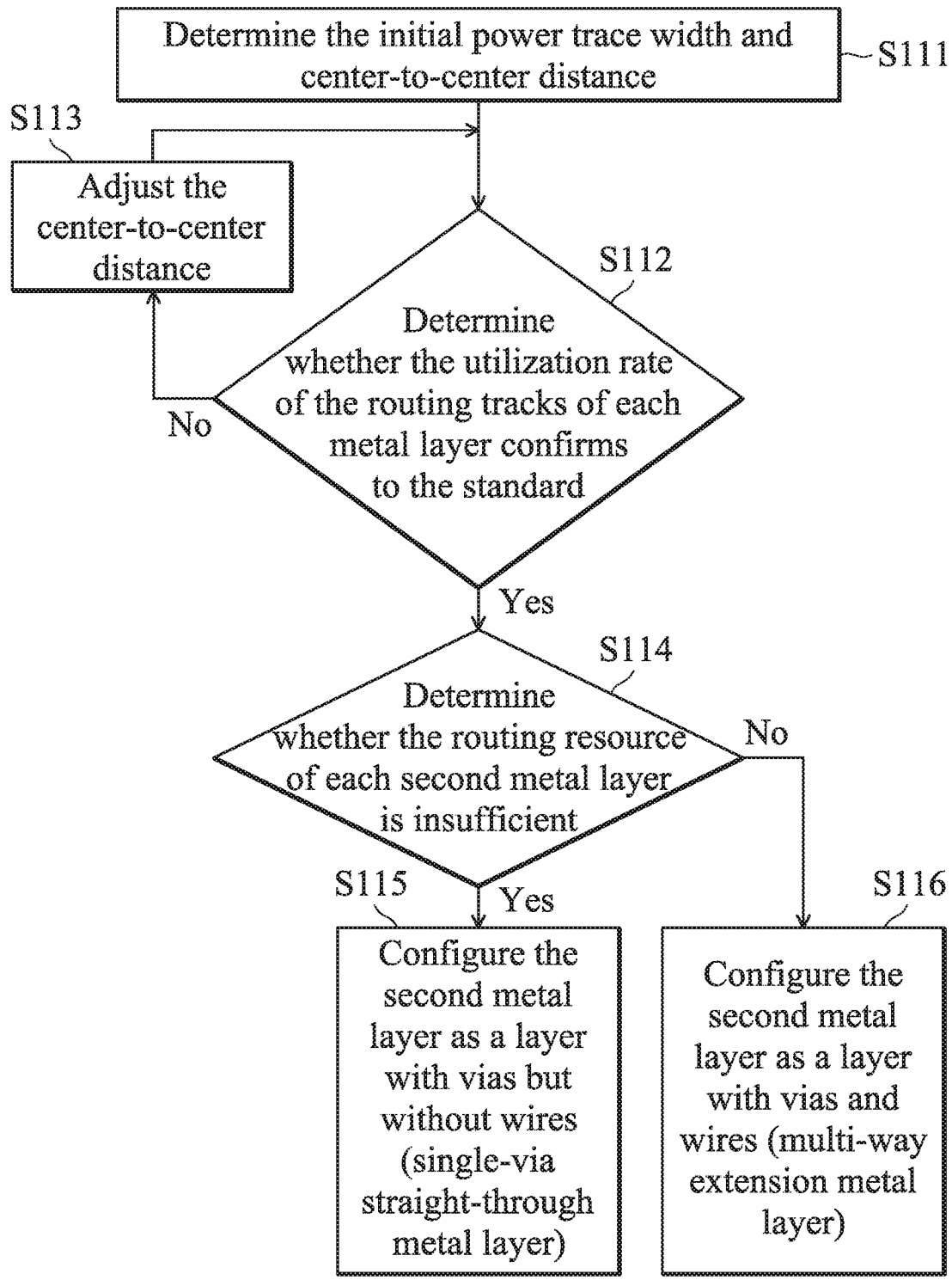
FIG. 1 is a possible flow chart of a method for designing a power network according to one exemplary embodiment.

FIG. 1 is a flow chart of a method for designing a power network 100 according to an exemplary embodiment of the present invention. The method for designing a power network 100 is suitable for a power network. The power network comprises an upper-layer portion, a middle portion, and a bottom-layer portion. The middle portion is located between the upper-layer portion and the bottom-layer portion. The upper-layer portion comprises at least one first metal layer, the middle portion comprises at least one second metal layer, and the bottom-layer portion comprises at least one third metal layer. Each layer of the first, second and third metal layers comprises a plurality of regions with the same area. For clear illustration, each region of each first metal layer is referred to as a first routing track, each region of each second metal layer is referred to as a second routing track, and each region of each third metal layer is referred to as a third routing track.

First, in Step S111, the width of each power trace on each first metal layer and the center-to-center distance between two adjacent power traces on each first metal layer are determined. In the embodiment, the first metal layer(s) may comprise a power point for receiving a power voltage provided by an external power supply device. Therefore, the distance between the first metal layer(s) and the external power supply device is shorter than the distance between the second metal layer(s) and the external power supply device and the distance between the third metal layer(s) and the external power supply device. In addition, the distance between the third metal layer(s) and the external power supply device is longer than the distance between the first metal layer(s) and the external power supply device and the distance between the second metal layer(s) and the external power supply device.

In a possible embodiment, after completing a layout design, the designer may plan a preliminary power network and define the maximum carrying current in advance. In this example, in Step S111, a corresponding via width is found by searching a lookup table according to the maximum carrying current. The lookup table records a plurality of carrying currents and a plurality of via widths corresponding to each of the carrying currents. In one possible embodiment, the lookup table is stored in the memory. In this embodiment, in Step S111, according to the maximum carrying current defined by the designer, the memory is accessed to obtain the via width corresponding to the maximum carrying current. In a possible embodiment, in Step S111, the initial width of each power trace of each first metal layer and the distance between two adjacent power traces (such as the distance between the centers of the two adjacent power traces) of each first metal layer are determined according to the via width corresponding to the maximum carrying current of each first metal layer. In a possible embodiment, in Step S111, the initial width of each power trace of each second metal layer and the distance between two adjacent power traces (such as the distance between the centers of the two adjacent power traces) of each second metal layer are determined according to the via width corresponding to the maximum carrying current of each second metal layer. In a possible embodiment, in Step S111, the initial width of each power trace of each third metal layer and the distance between two adjacent power traces (such as the distance between the centers of the two adjacent power traces) of each third metal layer are determined according to the via width corresponding to the maximum carrying current of each third metal layer.

In Step S112, whether the utilization rates of the routing tracks of each first metal layer, each second metal layer and each third metal layer confirm to the standard is determined. In an possible embodiment, in Step S112, whether the utilization rate of the first routing tracks of each first metal layer is equal to a first value is determined, whether the utilization rate of the second routing tracks of each second metal layer is equal to a second value is determined, and whether the utilization rate of the third routing tracks of each third metal layer is equal to a third value is determined. Since the methods respectively for determining whether the utilization rates of the first, second and third routing tracks of the first, second and third metal layers confirm to the standard are the same in Step S112, the following content is taken an example based on determining whether the utilization rate of the first routing tracks of one first metal layer confirms to the standard, to describe how to determine whether the utilization rates of the first, second and third routing tracks of the first, second and third metal layers confirm to the standard in Step S112.

In the embodiment, the utilization ratio $Uti_T$ of the first routing tracks of the first metal layer is represented as:

$$Uti_T = \frac{PCH_T}{TCH_T} \times 100\%$$

Wherein, $PCH_T$ represents the number of first routing tracks covered by power traces, and $TCH_T$ is the total number of first routing tracks.

Figure 2A:
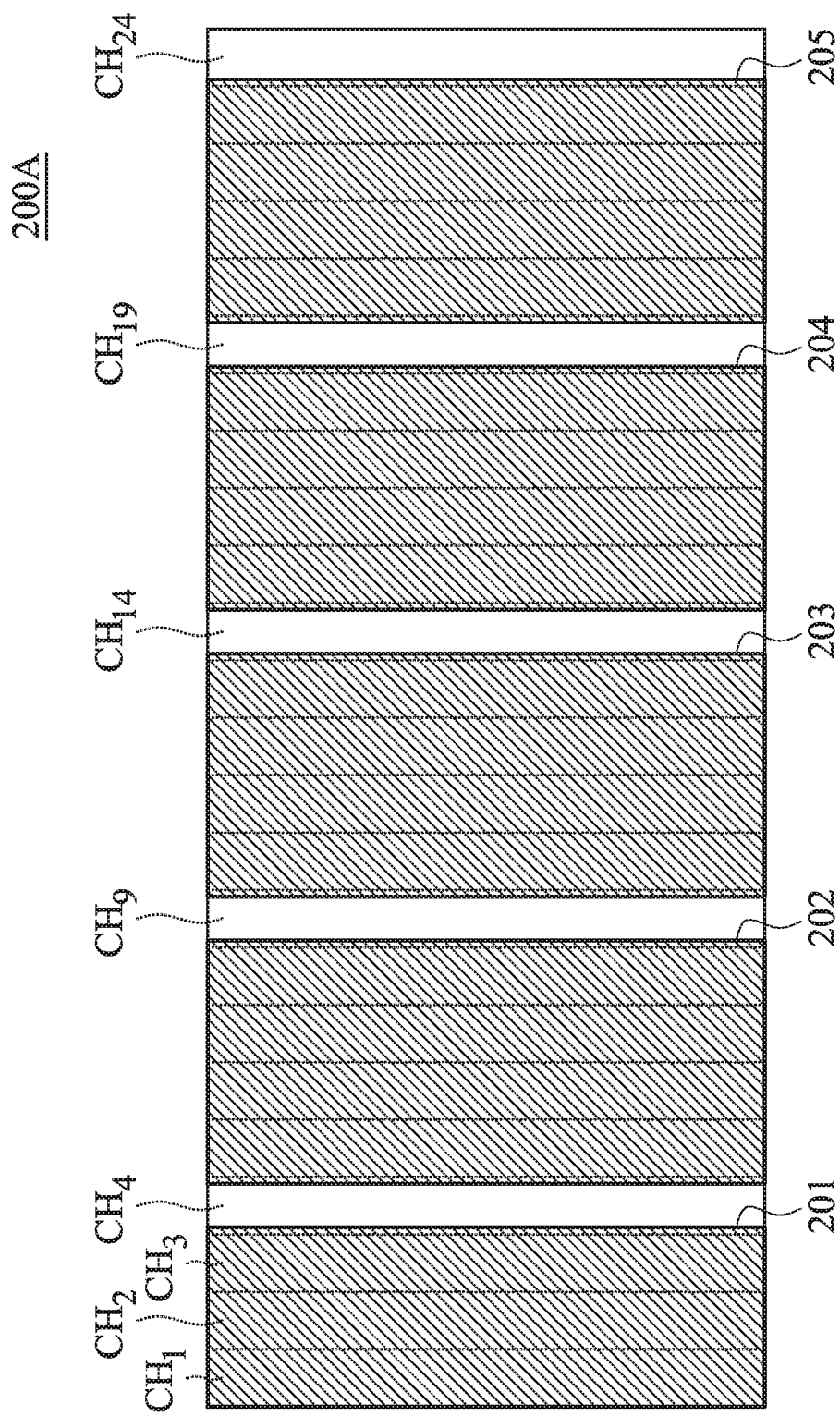

FIGS. 2A-2C are schematic diagrams of the routing tracks of the present invention. Each of the metal layers 200A~200C in FIGS. 2A~2C is, for example, the first metal layer. In the embodiment, the metal layer 200A comprises twenty-four routing tracks, as shown by the reference symbols $CH_1$~$CH_{24}$, however, which is not intended to limit the present invention. In other embodiments, the metal layer 200A may comprise more or fewer routing tracks. The size of the routing tracks is preset by the designer in advance.

In the embodiment, the routing tracks $CH_1$~$CH_4$ are covered by a power trace 201, the routing tracks $CH_4$~$CH_9$ are covered by a power trace 202, the routing tracks $CH_9$~$CH_{14}$ are covered by a power trace 203, the routing tracks $CH_{14}$~$CH_{19}$ are covered by a power trace 204, and the routing tracks $CH_{19}$~$CH_{24}$ are covered by a power trace 205. Since the routing tracks $CH_1$~$CH_{24}$ of the metal layer 200A are all covered by the power traces, the utilization rate of the routing tracks of the metal layer 200A is 100%, that is, (24/24)*100%.

As shown in FIG. 2B, only 12 routing tracks are covered by power traces, so the utilization rate of the routing tracks of the metal layer 200B is 50%, that is, (12/24)*100%. For example, the power trace 206 covers the routing tracks $CH_1$~$CH_4$, the power trace 207 covers the routing tracks $CH_{11}$~$CH_{14}$, and the power trace 208 covers the routing tracks $CH_{21}$~$CH_{24}$.

As shown in FIG. 2C, a power trace 209 covers the routing tracks $CH_1$ and $CH_2$, a power trace 210 covers the routing tracks $CH_{12}$ and $CH_{13}$, and the power trace 211 covers the routing tracks $CH_{23}$ and $CH_{24}$. In this embodiment, six routing tracks are covered by the power traces. Therefore, the utilization rate of the routing tracks of the metal layer 200C is 25% (=(6/24)*100%).

Please return to FIG. 1. In Step S113, when the utilization rate of the first routing tracks is not equal to the first value (such as 100%), the distance between the first power trace and the second power trace is adjusted, herein the first power trace and the second power are power traces of the first metal layer. In a possible embodiment, in Step S113, the distance between the first power trace and the second power trace is reduced.

Figure 3:
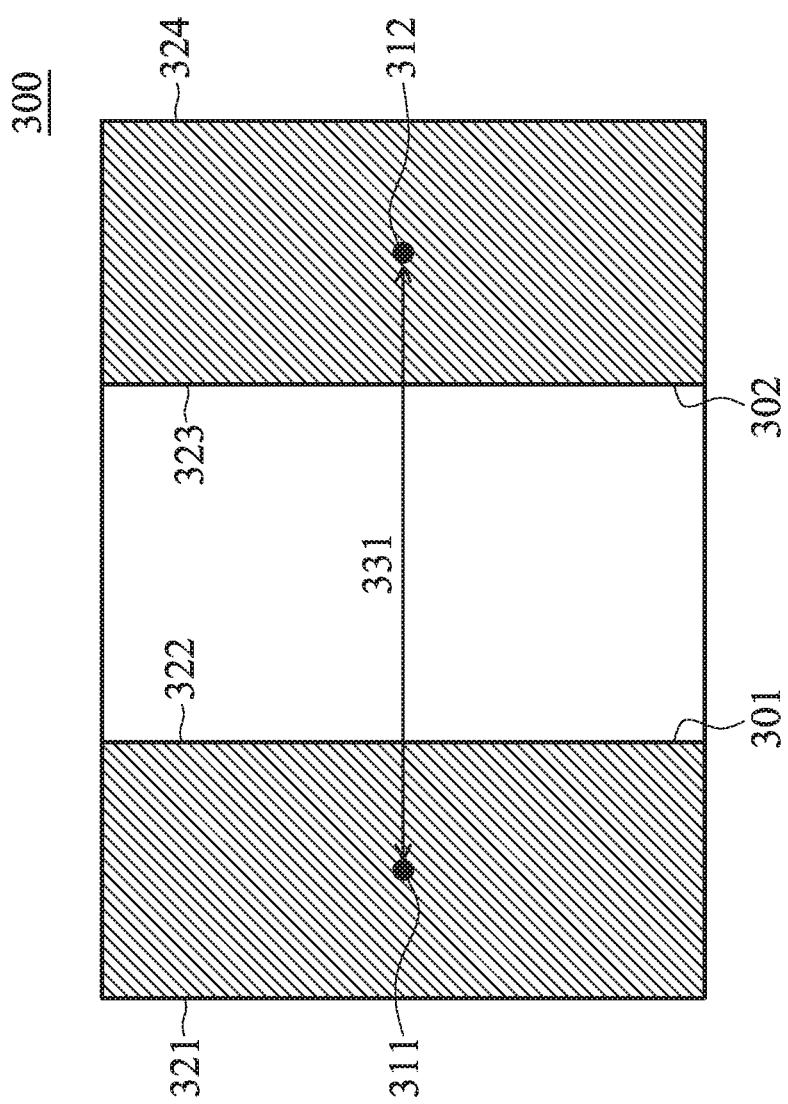
FIG. 3 is a schematic diagram of power traces according to an exemplary embodiment.

FIG. 3 is a schematic diagram of power traces according to an exemplary embodiment. For clear illustration, FIG. 3 does not show any routing track. In FIG. 3, a metal layer 300 comprises power traces 301 and 302. As shown in FIG. 3, the power traces 301 and 302 are adjacent to each other and transmit the same voltage, such as a voltage VDD or VSS. In a possible embodiment, the power trace 301 is electrically connected to the power trace 302.

In the embodiment, the power trace 301 comprises a center point 311 and edges 321 and 322. The distance between the center point 311 and the edge 321 is equal to the distance between the center point 311 and the edge 322. In the embodiment, the edge 321 is parallel to the edge 322. In addition, the power trace 302 comprises a center point 312 and edges 323 and 324. The distance between the center point 312 and the edge 323 is equal to the distance between the center point 312 and the edge 324. In the embodiment, the edge 323 is parallel to the edge 324. In addition, the edges 321~324 are parallel to each other.

In the embodiment, when the utilization rate of the routing tracks of the metal layer 300 is not equal to the first value, the distance 331 between the center points 311 and 312 is adjusted in Step S113, for example, the distance 331 between the center points 311 and 312 is reduced to short the distance between the power traces 301 and 302. In other embodiments, the distance 331 between the center points 311 and 312 may be increased in Step S113 to increase the distance between the power traces 301 and 302.

Referring to FIG. 1 again, when each of the utilization rates of the routing tracks of the first, second and third metal layers is equal to a corresponding value, that is, when each of the utilization rates of the routing tracks of the first, second and third metal layers confirms to the predetermined standard, Step S114 is performed to determine whether the routing resource of each second metal layer is insufficient. In a possible embodiment, when the number of signal traces of a certain second metal layer reaches a threshold, the routing resource of the second metal layer is in insufficient. Therefore, in Step S115, the second metal layer is configured as a single-via straight-through metal layer. The single-via straight-through metal layer is a metal layer with a plurality of vias, herein the vias are independent and insulated from each other, and there is no metal trace located between the vias. The vias of the single-via straight-through metal layer are used to electrically connect to the power traces of the first metal layer(s) and the third metal layer(s). In some embodiments, the vias of the single-via straight-through metal layer transmit the same voltage. In this case, the Step S115 of configuring the second metal layer as a single-via straight-through metal layer further comprises disposing a plurality of vias on the second metal layer, wherein the vias of the second metal layer transmit the voltage of the first metal layer to the third metal layer, and the vias of the second metal layer are independent of each other.

However, when the number of signal traces of the second metal layer has not reached the threshold, the routing resource of the second metal layer is sufficient. Therefore, in Step S116, the second metal layer is disposed as a multi-pipe dredging metal layer. A multi-pipe dredging metal layer is a metal layer comprising a plurality of vias and a plurality of power traces. In this embodiment, since the routing resource of the second metal layer is sufficient, in addition to the vias, the multi-pipe dredging metal layer further comprises a plurality of power traces for electrically connecting the vias. In this case, the Step S116 of configuring the second metal layer as a multi-pipe dredging metal layer further comprises disposing a plurality of vias and a plurality of power traces on the second metal layer. The power traces arranged on the second metal layer are used to electrically connect the vias on the second metal layer.

Figure 4:
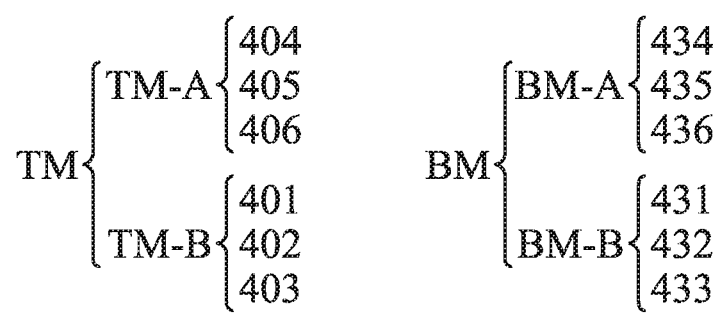
FIG. 4 is a schematic diagram of a model of a straight-through power network according to an exemplary embodiment.
Figure 4:
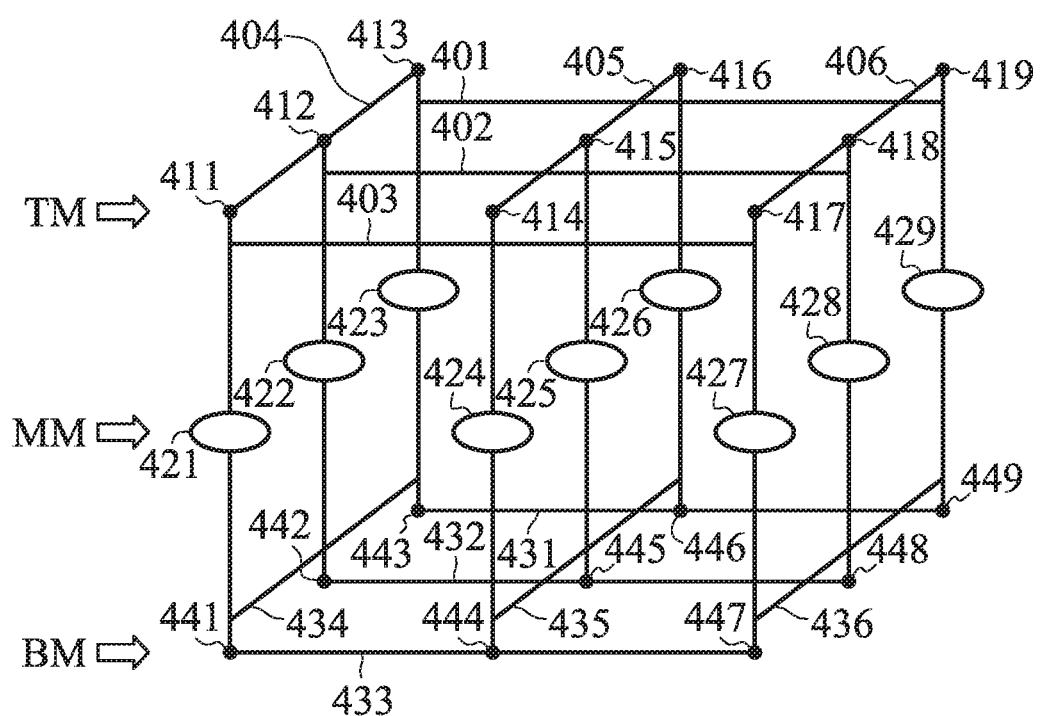

FIG. 4 is a schematic diagram of a power network 400 comprising a second metal layer designed as a single-via straight-through metal layer according to an exemplary embodiment. As shown in FIG. 4, the power network 400 with a single-via straight-through metal layer comprises an upper layer portion TM, a middle portion (or second-upper-layer portion) MM, and a bottom-layer portion BM. In other embodiments, at least one metal layer is further disposed between the upper-layer portion TM and the middle portion MM. Similarly, at least one metal layer is further disposed between the middle portion MM and the bottom-layer portion BM.

In the embodiment, the upper-layer portion TM comprises two first metal layers TM-A and TM-B. The power traces (also referred to as first metal traces) 401~403 are disposed on one of the first metal layers (such as TM-B). The power traces (also referred first metal traces) 404~406 are disposed on another first metal layer (such as TM-A). The vias (also referred to as first vias) 411~419 are disposed at the intersection points of the power traces of the metal layers. For example, the via 414 is disposed at intersection point of the power trace 403 and the power trace 405. The present invention does not intend to limit the number of power traces and the number of vias of each first metal layer. In other embodiments, each first metal layer comprises power traces and vias, however, the number of power traces is different from the number of power traces of the above embodiment, and the number of vias is different from the number of vias of the above embodiment. Each first metal layer comprises a plurality of first routing tracks. The power traces 401~406 and the vias 411~419 are disposed in these first routing tracks.

The power traces 401~403 are disposed in parallel and perpendicular to the power traces 404~406. In the embodiment, the power traces 401~406 are electrically connected to each other and transmit the same voltage. The present invention does not intend to limit the widths of the power traces 401~406. In a possible embodiment, the width of one of the power traces 401~406 is different from the width of another of the power traces 401~406. In addition, one of the power traces 401~406 is coupled to another of the power traces 401~406 through a via. For example, the power trace 401 is coupled to the power trace 404 through the via 413. In a possible embodiment, when the distance between two adjacent power traces is not enough to insert a metal trace (such as a power trace or a signal trace), the widths of the two adjacent power traces can be appropriately increased. In the example, the widths of the power traces 401~406 are greater than the widths of the vias 411~419.

The middle portion MM comprises a second metal layer, and the second metal layer comprises vias (also referred to as second vias) 421~429. In a possible embodiment, the second metal layer comprises a plurality of second routing tracks. In the example, each of the vias 421~429 is disposed in a corresponding second routing track(s). In some embodiments, when the number of signal traces of the second metal layer reaches a threshold, the routing density of the second metal layer in the middle portion MM is too high. Therefore, no power trace is disposed between the vias 421~429. In this embodiment, the vias 421~429 are not directly electrically connected to each other, but are electrically connected to each other indirectly through the power traces or vias of the other metal layers. For example, since there is no power trace between the via 421 and the via 422 or 424, the via 421 is not directly connected to the vias 422 and 424 of the second metal layer. However, the via 421 can be electrically connected to the via 422 indirectly through the vias 411 and 412 and the power trace 404 of the upper-layer portion TM. Similarly, the via 421 can be electrically connected to the via 424 indirectly through the vias 411 and 414 and the power trace 403 of the upper-layer portion TM. In this example, the second metal layer comprising the vias 421~429 is a single-via straight-through metal layer.

The bottom-layer portion BM comprises two third metal layers BM-A and BM-B. The power traces (also referred to as third metal traces) 431~433 are disposed on one of the third metal layers (such as BM-B). The power traces (also referred to as third metal traces) 434~436 are disposed on the other third metal layer (such as BM-A). The vias (also referred to as third vias) 441~449 are disposed at the intersection points of the power traces of the metal layers. For example, the via 444 is disposed at the intersection point of the power trace 433 and the power trace 435. In a possible embodiment, each third metal layer comprises a plurality of routing tracks. The power traces 431~436 and the vias 441~449 are disposed in the routing tracks. Since the features of the power traces 431~436 and the vias 441~449 are the same as the features of the power traces 401~406 and the vias 411~419, the related description will not be repeated here. In the embodiment, the vias 441~449 are electrically connected to the vias 421~429 respectively.

In a possible embodiment, the utilization rates of the first routing tracks of the respective first metal layers are equal, and the utilization rate of the first routing tracks of the first metal layers is greater than the utilization rate of the second routing tracks of each second metal layer. The utilization rates of the second routing tracks of the respective second metal layers are also equal. For example, the metal traces (such as the metal traces 401~406) and the vias (such as the vias 411~419) of each first metal layer occupy all the routing tracks of the corresponding first metal layer, and the vias (such as the vias 421~429) of each second metal layer occupy half of the routing tracks of the corresponding second metal layer. In addition, the utilization rate of the second routing tracks of each second metal layer is greater than the utilization rate of the third routing tracks of each third metal layer. The utilization rates of the third routing tracks of the respective third metal layers are equal. For example, the vias (such as the vias 421~429) of each second metal layer occupy half of the routing tracks of the corresponding second metal layer, and the power traces (such as the power traces 431~439) and the vias (such as the vias 441~449) of each third metal layer occupy a quarter of the routing tracks of the corresponding third metal layer.

Figure 5:
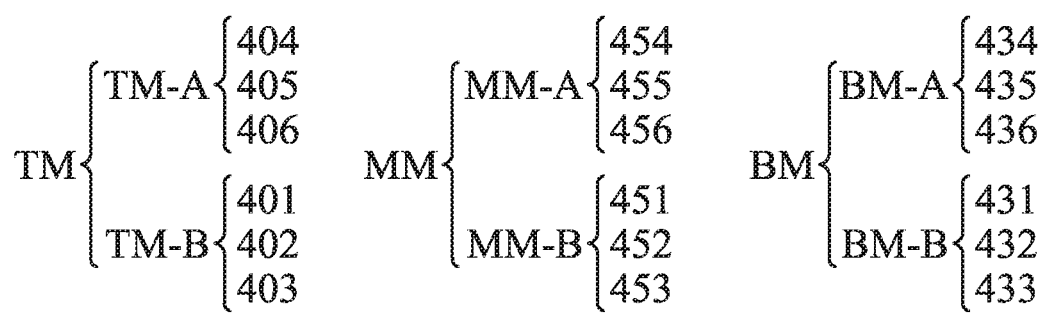
FIG. 5 is a schematic diagram of a model of a multi-pipe dredging power network according to an exemplary embodiment.
Figure 5:
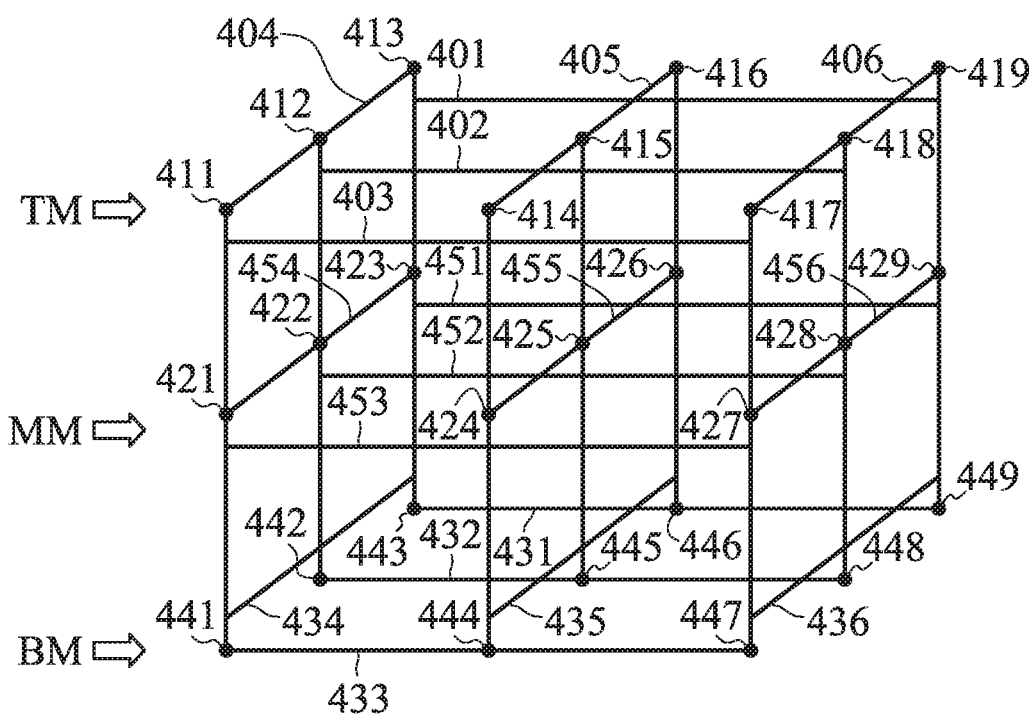

FIG. 5 is a schematic diagram of a model of a multi-pipe dredging power network 500 according to an exemplary embodiment. The structure shown in FIG. 5 is similar to the structure shown in FIG. 4, except that the second metal layers of the middle portion MM of the multi-pipe dredging power network 500 of FIG. 5 are two multi-pipe dredging metal layers (such as MM-A and MM-B). Thus, the middle portion MM further comprises power traces (also referred to as second metal traces) 451~456. The power traces 451~456 are electrically connected to vias 421~429. In the embodiment, the power traces 451~456 are electrically connected to each other.

Figure 6:
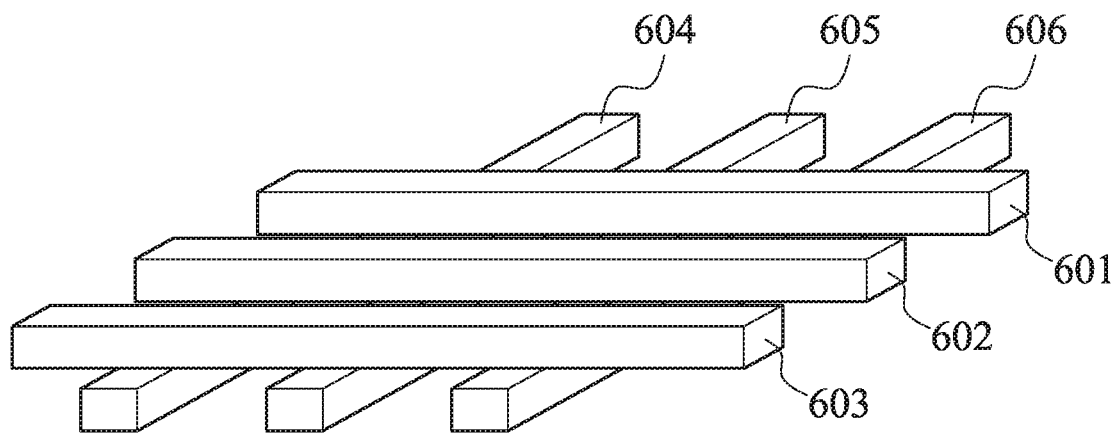
FIG. 6 is a schematic diagram of metal layers of FIG. 5.

FIG. 6 is a schematic diagram of a metal layer 600 according to an exemplary embodiment of the present invention. FIG. 6 shows, for example, an upper-layer portion TM comprises two first metal layers, or, for example, a bottom-layer portion BM comprising two third metal layers, or, for example, a middle portion MM comprises at least two second metal layers. As shown in FIG. 6, the metal layer 600 comprises power traces 601~606. The power traces 601~603 belong to a metal layer, and the power traces 601 to 603 are parallel to each other. The power traces 604~606 belong to another metal layer, and the power traces 604~606 are parallel to each other. The metal layer where the power traces 601~603 are disposed may be directly stacked on the metal layer where the power traces 604~606 are disposed, or other metal layers may be inserted between the metal layer where the power traces 601~603 are disposed and the metal layer where the power traces 604~606 are disposed. In this example, vias or a via layer (not shown) are located where the power traces 601~603 overlap the power traces 604~606.

Figure 7A:
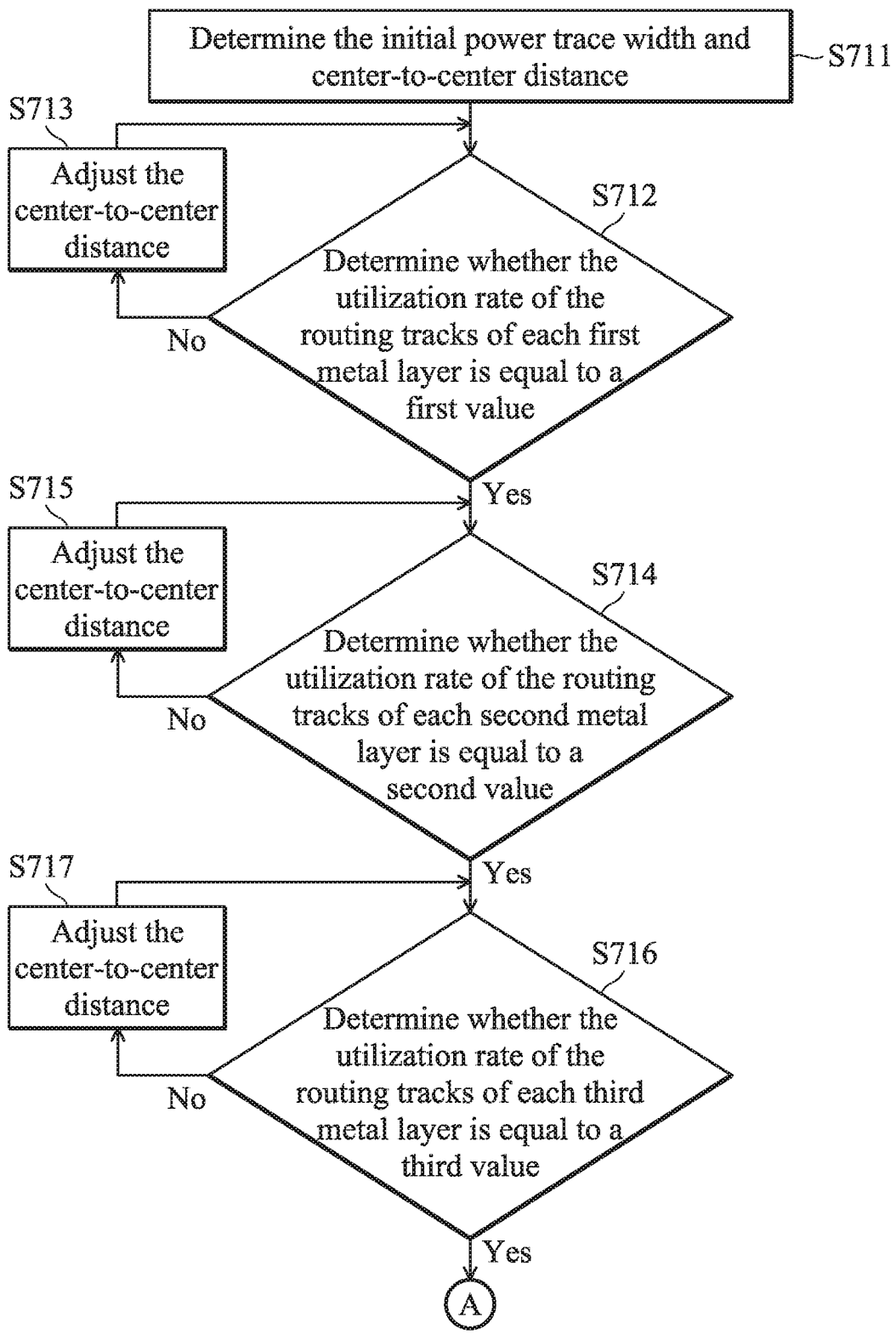
FIG. 7A-7B is a flow chart of a method for designing a power network according to another exemplary embodiment.
Figure 7B:
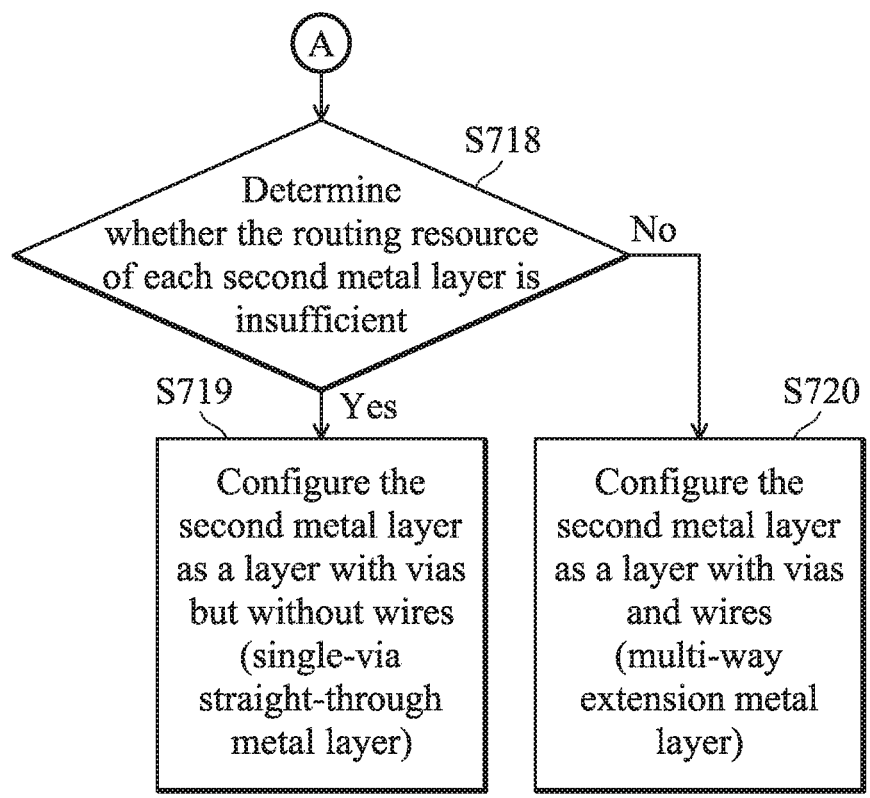

FIG. 7 is another schematic diagram of a power network design method 700 of the present invention. The embodiment of FIG. 7 is similar to the embodiment of FIG. 1, except that the embodiment of FIG. 7 gradually determines whether the utilization rates of the routing tracks of each first metal layer, each second metal layer and each third metal layer are respectively equal to the first value, the second value and the third value. Since Steps S711~S713 of FIG. 7 are similar to Steps S111~S113 of FIG. 1, the related description will not be described again.

In Step S714, it is determined whether the utilization rate of the second routing tracks of each second metal layer is equal to the second value. When the utilization rate of the routing tracks of a certain second metal layer is not equal to the second value, the distance between a third power trace and a fourth power trace of the second metal layer is adjusted (Step S715). In a possible embodiment, the third power trace and the fourth power trace are electrically connected to each other. In this embodiment, the third power trace and the fourth power line may be electrically connected to a first power trace and a second power trace of a certain first metal layer.

When the utilization rates of the routing tracks of all the second metal layers are equal to the second value, it is determined whether the utilization rate of the routing tracks of each third metal layer is equal to the third value in Step S716. When the utilization rate of the third routing tracks of a certain third metal layer is not equal to the third value, the distance between a fifth power trace and a sixth power trace of the third metal layer is adjusted in Step S717. In a possible embodiment, the fifth power trace and the sixth power trace are electrically connected to each other. In this embodiment, the fifth power trace and the sixth power trace may be electrically connected to the first power trace and the second power trace of a certain first metal layer and further to the third power trace and the fourth power trace of a certain second metal layer.

When the utilization rates of the routing tracks of all the third metal layers are equal to the third value, the utilization rates of the routing tracks of the first, second, and third metal layers have reached the standard. In Step S718, it is determined whether the routing resource of each second metal layer is insufficient. Since Steps S718~S720 are the same as Steps S114~S116 of FIG. 1, the related description will not be described again.

In some embodiments, the first value of Step S712 is greater than the second value of Step S714. In these embodiments, the second value in Step S714 is greater than the third value in Step S716. For example, when all the routing tracks of each first metal layer are covered by the power traces, the utilization rate of the routing tracks of each first metal layer is equal to a first value, such as 100%. In these embodiments, when half of the routing tracks of each second metal layer are covered by the power traces, the utilization rate of the routing tracks of each second metal layer is equal to the second value, such as 50%. When a quarter of the routing tracks of each third metal layer are covered by the power traces, the utilization rate of the routing tracks of each third metal layer is equal to the third value, such as 25%.

Figure 8:
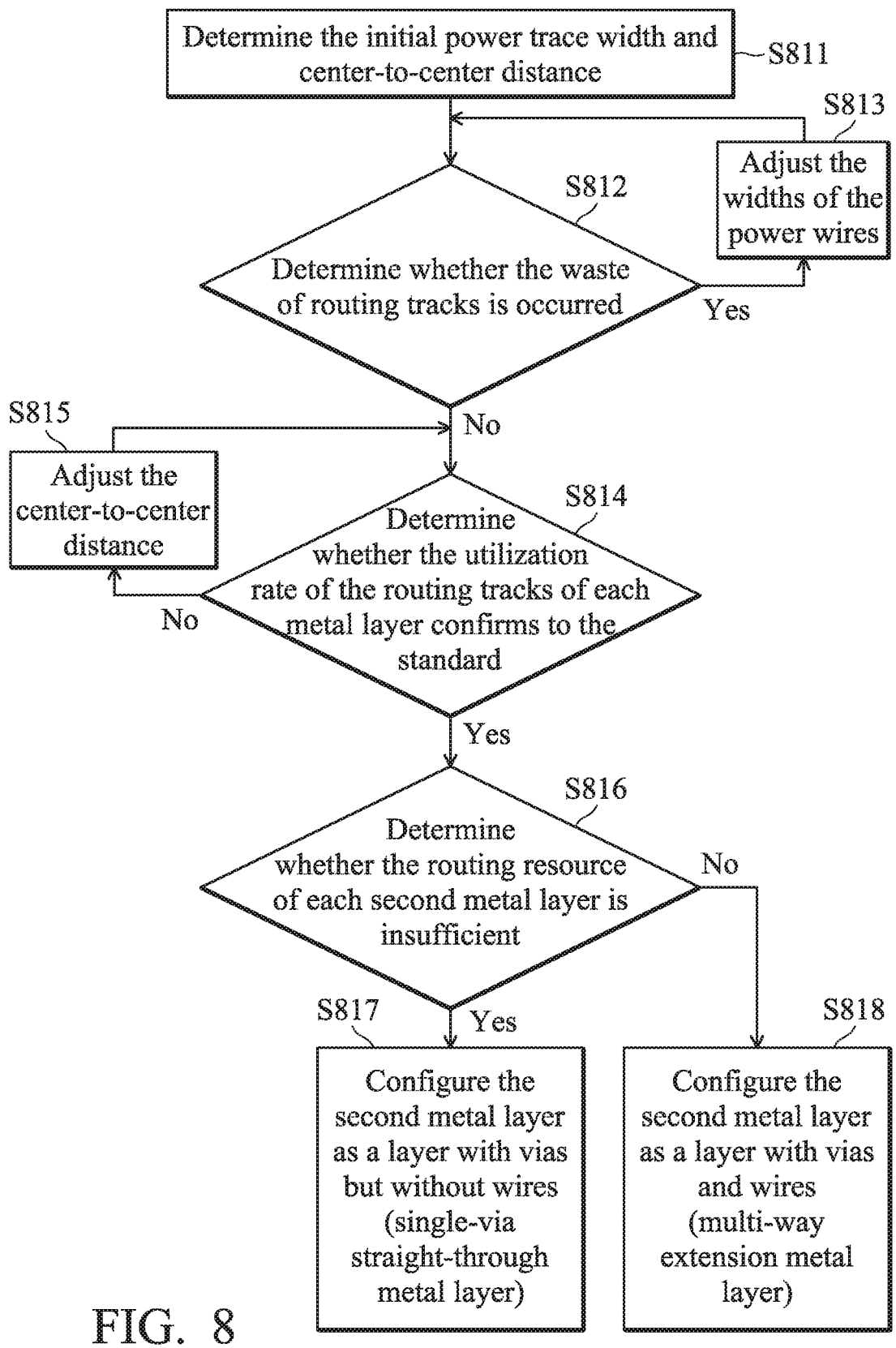
FIG. 8 is a flow chart of a method for designing a power network according to another exemplary embodiment.

FIG. 8 is a flow chart of a method for designing a power network according to another exemplary embodiment. First, the width of each power trace of a first metal layer(s) and the center-to-center distance between two adjacent power traces of the first metal layer(s) are determined (Step S811). Since Step S811 is similar to Step S111 of FIG. 1, the related description will not be described again.

Then, whether the adjacent metal traces of each of the first, second, and third metal layers cause the waste of routing tracks is determined (Step S812). For the convenience of description, a first metal layer is taken as an example below. In a possible embodiment, whether the distance between the adjacent first power trace and second power trace of the first metal layer is greater than a predetermined distance is determined in Step S812.

Figure 9:
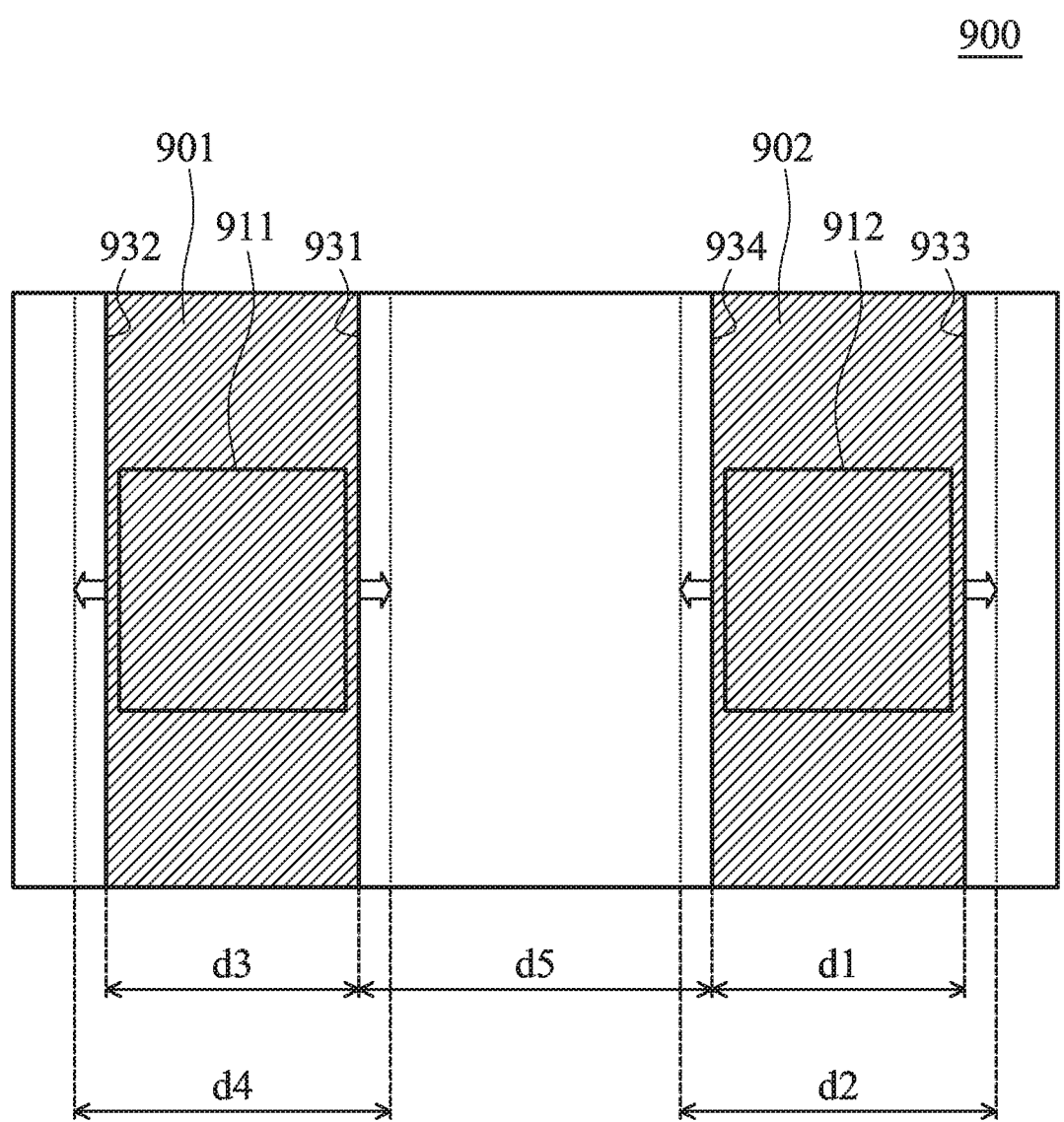
FIG. 9 is a schematic diagram of a power trace according to another exemplary embodiment.

When the distance between the first power trace and the second power trace is greater than the predetermined distance, the positions of the first power trace and the second power trace cause waste of routing tracks. Taking FIG. 9 as an example, the distance d5 between the power trace 901 and the power trace 902 is greater than a predetermined distance. In addition, the space between the power traces 901 and 902 is not enough to configure any signal trace, so that, there is an idle routing track between the power traces 901 and 902, that is, part of the routing tracks is not covered by any metal trace. Therefore, in Step S813, the widths of the first and second power traces are increased. For example, the width of the power trace 901 is increased from d3 to d4, and the width of the power trace 902 is increased from d1 to d2. In this embodiment, after the widths of the power traces 901 and 902 are increased, the voltage drop caused by the power traces 901 and 902 can be reduced, and the ability of the power traces 901 and 902 of carrying currents can be improved.

In other embodiments, the width of the power trace 901 or 902 is adjusted in Step S813. In other words, in Step S813, the adjustment is done only to the right boundary 931 of the power trace 901, so as to move the right boundary 931 toward the left boundary 934 of the power trace 902 without moving the left boundary 932 of the power trace 901. Similarly, in Step S813, the adjustment may be done only to the left boundary 934 of the power trace 902, so as to move the left boundary 934 toward the right boundary 931 of the power trace 901 without moving the right boundary 933 of the power trace 902.

In some embodiments, there is a via 911 in the projection direction of the power trace 901, and there is a via 912 in the projection direction of the power trace 902. In this example, the original width of the power trace 901 is equal to the width of the via 911. After the adjustment, the width of the power trace 901 is greater than the width of the via 911. Similarly, the original width of the power trace 902 is equal to the width of the via 912. After the adjustment, the width of the power trace 902 is greater than the width of the via 912. The present invention does not intend to limit the width of the power traces 901 and 902. In a possible embodiment, the width d4 of the power trace 901 may be the same as or different from the width d2 of the power trace 902.

Through the adjustment of the width(s) of the power trace(s) in Step S813, the voltage drop caused by the power traces is reduced, thereby improving the ability of the power traces of carrying currents. In addition, when the routing resource of the second metal layer is insufficient, a power network with a corresponding type is provided, such as a power network comprising a single-via straight-through metal layer, thereby reducing the number of power traces of the second metal layer(s) and avoiding that the widths of the power traces are excessively narrow.

Furthermore, the first metal layer(s) needs to carry a larger current, while the second metal layer(s) carries a lower current than the first metal layer(s), and the third metal layer(s) carries a lower current than the second metal layer(s). Therefore, the ability of the first metal layer(s) of carrying currents must be greater than the abilities of the second and third metal layers of carrying currents, and the ability of the second metal layer(s) of carrying currents must be greater than the ability of the third metal layer(s) of carrying currents. In a possible embodiment, by adjusting the center-to-center distance between two adjacent power traces, the utilization rate of the routing tracks of each metal layer can be controlled, and, thus, the ability of each metal layer to carry currents can be set.

The methods for designing power networks, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes processing circuits for practicing the methods. The methods may also be embodied in the form of a program code transmitted over some transmission medium, such as electrical routing or cabling, through fiber optics, or via any other form of transmission, wherein, when the program code is received and loaded into and executed by a machine such as a computer, the machine becomes processing circuits for practicing the disclosed methods. When implemented on a general-purpose processor, the program code combines with the processor to provide a unique apparatus that operates analogously to application-specific logic circuits.

Unless otherwise defined, all vocabularies (including technical and scientific vocabularies) herein can be understood easily by persons with ordinary knowledge in the technical field of the present invention. In addition, unless clearly stated, the definition of vocabularies in a general dictionary should be interpreted as consistent with the meaning in the articles in the related technical field and should not be interpreted as an ideal state or an overly formal voice. Although terms such as "first" and "second" are used to describe various components, these components should not be limited by these terms. These terms are only used to distinguish one component from another.

While the present invention has been disclosed in the preferred embodiments as above, it is not intended to limit the present invention. On the contrary, it is intended to cover various modifications and similar arrangements (as would be apparent to persons with ordinary knowledge in the technical field of the present invention). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A power network comprising:
a first metal layer, comprising a plurality of first routing tracks, a plurality of first power traces, and a plurality of first vias, wherein said plurality of first power traces are electrically connected to said plurality of first vias;
a second metal layer, comprising a plurality of second routing tracks and a plurality of second vias, wherein said plurality of second vias are electrically connected to said plurality of first vias; and
a third metal layer, comprising a plurality of third routing tracks, a plurality of third power traces, and a plurality of third vias, wherein said plurality of third power traces are electrically connected to said plurality of second vias and said plurality of third vias,
wherein a utilization rate of said plurality of first routing tracks is greater than a utilization rate of said plurality of second routing tracks, and said utilization rate of said plurality of second routing tracks is greater than a utilization rate of said plurality of third routing tracks.

2. The power network as claimed in claim 1, wherein said plurality of first power traces are electrically connected to each other, and a width of one of said plurality of first power traces is different from a width of another of said plurality of first power traces.

3. The power network as claimed in claim 1, wherein a width of one of said plurality of first power traces is greater than a width of one of said plurality of first vias.

4. The power network as claimed in claim 1 wherein said plurality of second vias of said second metal layer are insulated from each other.

5. The power network as claimed in claim 1, wherein said plurality of first routing tracks are covered by said plurality of first power traces.

6. The power network as claimed in claim 1, wherein said second metal layer further comprises a plurality of second power traces, and said plurality of second power traces are electrically connected to said plurality of second vias.

7. The power network as claimed in claim 6, wherein said plurality of first power traces, said plurality of second power traces, and said plurality of third power traces are electrically connected to each other through said plurality of first vias, said plurality of second vias, and said plurality of third vias.

8. The power network as claimed in claim 6, wherein half of said plurality of second routing tracks are covered by said plurality of second power traces, and a quarter of said plurality of third routing tracks are covered by said plurality of third power traces.

* * * * *